Sheet-1-2 Sheets.

W. V. Gee.

Weaving Button Holes.

No. 494.

Reissued Sept. 15, 1857.

N. PETERS, PHOTO-LITHOGRAPHER, WASHINGTON, D. C.

Sheet 2-2 Sheets.
W. Gee.
Weaving Button Holes.
No. 494.
Reissued Sept. 15, 1857.
Fig. 2.
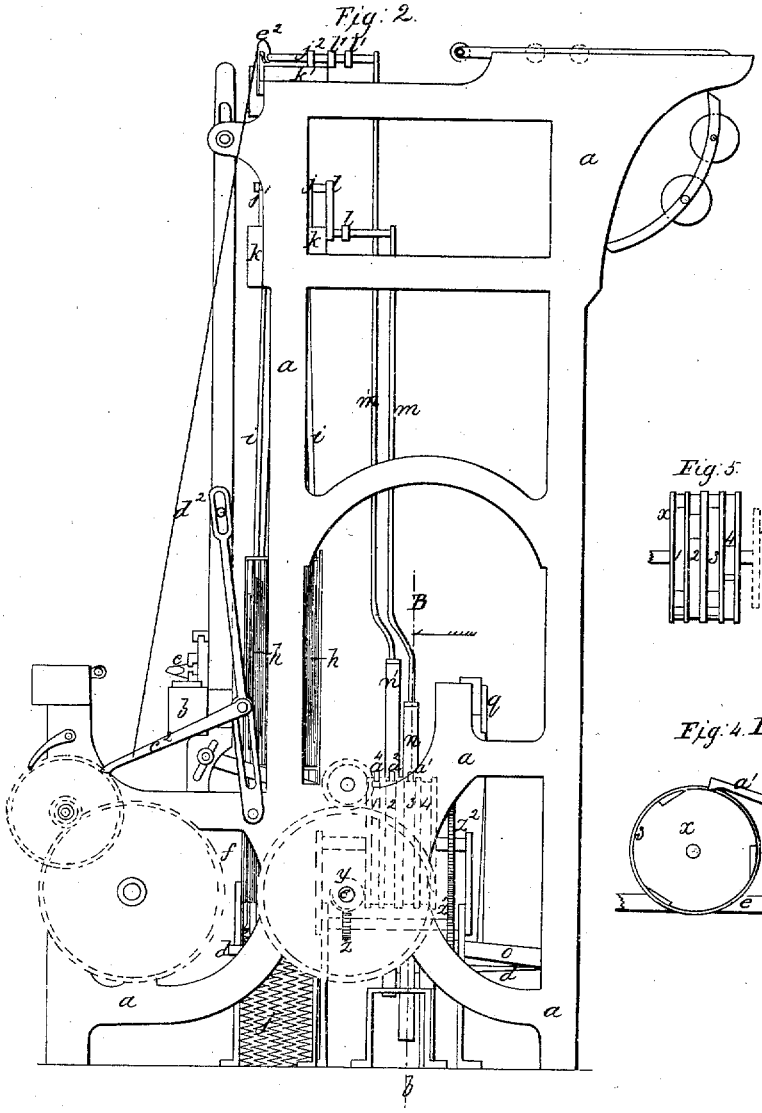
Fig. 3. A a.
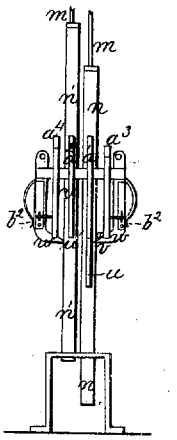
Fig. 5.
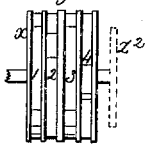
Fig. 4. B. b.
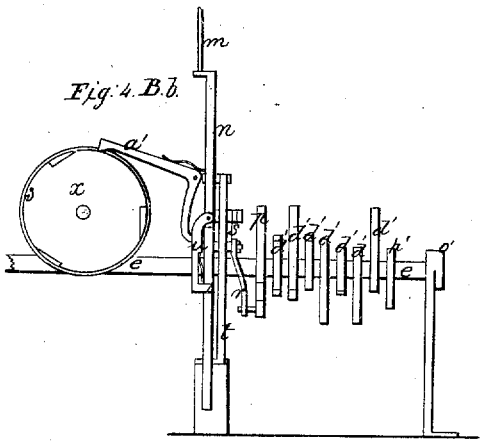
N. PETERS, PHOTO-LITHOGRAPHER, WASHINGTON, D. C.

UNITED STATES PATENT OFFICE.

WILLIAM V. GEE, OF NEW HAVEN, CONNECTICUT, ASSIGNOR TO THE ATWATER & BRISTOL MANUFACTURING COMPANY.

IMPROVEMENT IN LOOMS.

Specification forming part of Letters Patent No. 12,457, dated February 27, 1855; Reissue No. 494, dated September 15, 1857.

*To all whom it may concern:*

Be it known that I, WILLIAM V. GEE, of New Haven, in the State of Connecticut, have invented certain new and useful improvements in looms for forming slits or button-holes with proper selvages in the process of weaving, webbing, and various other fabrics; and I do hereby declare that the following, taken in connection with the drawings, is a full, clear, and exact description thereof.

Figure 6:
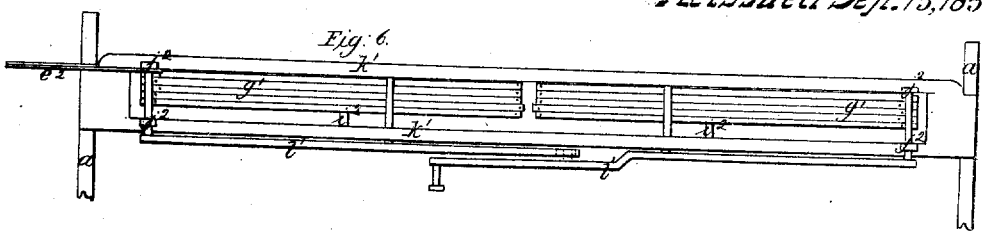
Figure 1:
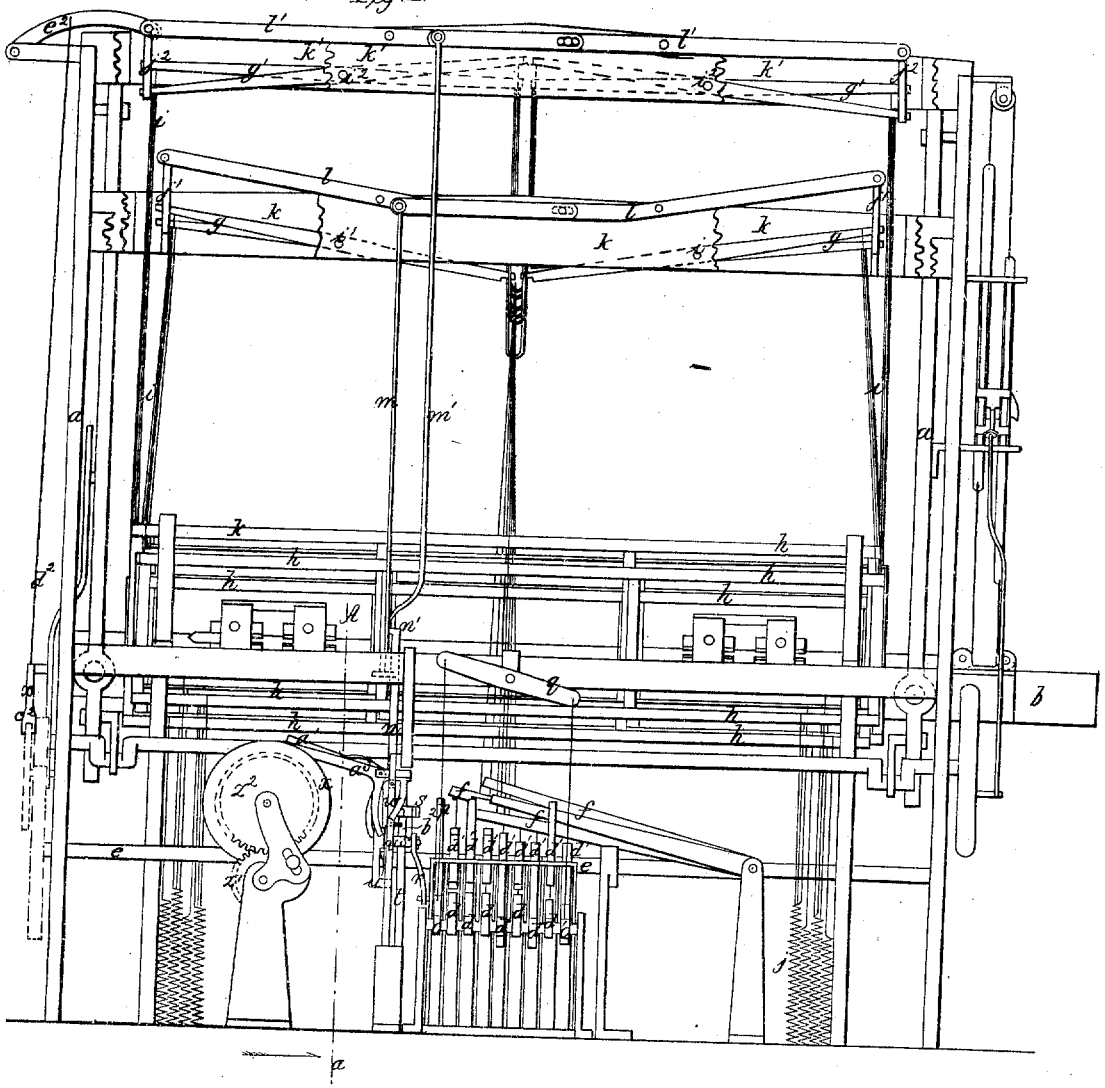

In the drawings, Figure 1 is a rear elevation with certain parts of the framing removed. Fig. 1 is a side elevation. Figs. 3 and 4 are sections of details taken at the line A *a*, of Fig. 1, and B *b* of Fig. 2. Fig. 5 is an edge view of the cam, barrel, &c. Fig. 6 is a plan of the beams *k′ k′* and levers *l′ l′*.

The same letters refer to the same parts in all the figures.

The object of my invention is to form button-holes or slits in the process of weaving, such holes or slits having selvages similar to the ordinary selvages, and being of greater or less number in the width of a fabric as may be necessary; and I believe that the chief use of my invention will be in weaving button-holes in suspenders and their tabs.

And the nature of the first part of my invention consists in mounting a loom with two or more sets of harness, each set governing all the warp-threads on one side of a button-hole, so that one set may be forming a shed on one side of a button-hole while the other set is out of action, substantially as hereinafter specified.

And the nature of the second part of my invention consists in connecting each set of harness under an arrangement as hereinafter described, with a bar or slide governed by a cam or catch or the equivalents thereof for the purpose of throwing out of action one or other set of harness, as may be necessary, substantially in the manner hereinafter set forth.

And my invention also consists in combining with the herein-described mechanism for causing one set of harness to cease its action, or any equivalent therefor, mechanism substantially such as is hereinafter specified for determining the period during which one or other set of harness shall be out of action, or the time or moment when either set of harness shall be thrown out of action.

And my invention further consists in combining a slow-moving cam or cams or their equivalents, for determining the time when, and period during which, a set of harness shall be out of action with harness mounted in sets, so that alternate sets may be in and out of action as may be required in the process of weaving button-holes, substantially as hereinafter set forth.

And my invention further consists in combining with two sets of harness, each governing the warp-threads on either side of a button-hole, a contrivance substantially such as is hereinafter specified, or any equivalent therefor, for throwing the take-up motion out of gear at proper times substantially in the manner and for the purposes hereinafter described. And also in combining with mechanism for stopping and starting a take-up motion substantially such as is specified a slow-moving cam, or any equivalent therefor, to determine the proper period at which the take-up motion shall cease to operate and shall again be put in operation in the process of weaving slits or button-holes, substantially as hereinafter set forth.

The loom described by me in this specification as an exemplification of my invention is one of ordinary character employed for weaving webbing, and I have shown my invention as adapted to a treadle-loom in which the shed is formed by lifting one set of warp-threads, and will describe the harness as being thrown out of action by lifting all the warp-threads and permitting them to remain lifted, that being one way of preventing them from forming a shed.

The loom has an ordinary framing, *a a*, a lay, *b*, shuttles *c c*, and reeds, gearing, warps, bobbins, and all the usual accessories of a webbing-loom, not described, as they form no part of my invention.

Now, in weaving a button-hole it is necessary that stuff of only one-half the whole width of the fabric (supposing there to be only one button-hole in the whole width) shall be woven at one time, and this first on one side and then on the other of the hole. After the whole length of the button-hole is woven then the fabric must be woven of full width until it is time to form another button-hole, and all my improvements are made with a view of performing this simple office automatically in an efficient manner and with sufficient speed to enable the manufacturer to compete in the market with suspenders having other sorts of button-holes.

In the loom shown in the drawings there are two sets of harness in leaves *h h h h*, the number of leaves in each set being governed by the pattern and kind of webbing required; but each set is alike, and all the warp-threads which lead on one side of a button-hole and form a part of the fabric on one side of a hole pass through the mails or eyes of the headles of one set of harness only. Each set of harness with its threads is complete in itself and capable of weaving an entire fabric of a width equal to that between a button-hole and the selvage of the fabric, and if both sets of harness be in operation at the same time a fabric of full width can be woven. These leaves of one set are connected by wires or cords *i i* to a set of jacks or levers, *g g*, and the leaves of the other sets are connected by like wires to another set of jacks *g′ g′*. These sets of jacks are pivoted respectively at $i'$ $i'$ $i^2$ $i^2$, and the inner end of each jack is by means of a rod or cord in connection with one of a set of treadles, *d d d*, through the intervention of a series of counter-levers, *f f f f*, the action being (in a manner well known to weavers) such that the revolutions of cams or pattern-wheels $d'$ $d'$ $d'$, elevate leaves of harness at proper times, such leaves descending by their own gravity or by the force of weights or springs; such as *j j*.

So far there is nothing unusual in the loom except the two complete and distinct sets of harness, each controlling warp-threads on one side of a button-hole only, and the loom will, if set in action, weave a piece of webbing like an ordinary loom; but when the time has arrived for weaving a button-hole one or other of these sets of harness must be thrown out of action, so that a shed is formed on one side only of a button-hole. Under the present arrangement, this is effected by lifting all the warp-threads governed by one set of harness above the shuttle. For this purpose stirrups $j'$ $j'$ $j^2$ $j^2$ are arranged to slide in grooves *k k k′ k′*. The cross-bars of these stirrups underlie the outer ends of all the jacks *g g*, and when any one pair of stirrups is lifted it raises the outer ends of the jacks which it underlies, and consequently lifts all the heddle-leaves and their warp-threads which depend for their action upon those jacks. These stirrups are hung upon the end of levers *l l l l′*, pivoted as shown in the drawings. One lever in each pair is longer than its fellow, and has in it a slot through which projects a pin fastened in the other lever and to these long ends are attached rods *m m*, which are secured to sliding bars *n n*, the whole arrangement being such that the depression of either bar will lift one pair of stirrups, and consequently one set of harness with its warp-threads, thus preventing the pattern-cams from moving that set of harness and throwing it out of action, so that a fabric is woven only equal in width to that due to the warp-threads governed by the other set of harness. In order that this effect may take place, other cams, *p p′*, are secured in the revolving shaft *e*, which cams act on treadles *o o′*, each treadle being connected by a wire or cord to one end of a lever-beam, *q*, pivoted on its center, so that when one treadle is depressed by an elevation on its actuating-cam the other treadle is lifted, the arrangement being a convenient one for giving a positive reciprocating motion to one treadle. One of these treadles—as *o*—is connected by a joint link, *r*, to a slide, *s*, moving in ways or guides *t*, and this slide has therefore a reciprocating motion.

Each sliding bar has attached to it a spring catch, *u u*, (see Figs. 3 and 4 specially,) and when this catch is thrown toward the slide its point comes within reach of the slide, which therefore depresses the bar until it carries a notch, *v*, formed in the slide so low that a spring-dog, *w*, (see Fig. 3,) falls into the notch and holds the bar depressed, and consequently keeps one set of harness out of action. When it becomes necessary to lower either bar thus depressed, a pin, $b^2$, (one for each dog, and passing through it,) is thrown toward the slide *s* so far as to come within reach of a cam-formed projection on that slide, which in its vibrations strikes the pin and forces the dog out of its notch, permitting the bar to rise, drawn up by the weights of one set of harness and its springs, so that this set of harness may again be thrown into action. But it is necessary that the machinery itself should point out the precise time at which each set of harness should be thrown out of action, and also the period during which it should remain inactive, as the distance between any two button-holes in the length of the fabric and the length of each button-hole depend upon these times and periods. There is, therefore, mounted in the loom a slow-moving cam, *x*, which receives motion in any proper manner, for instance by a worm-wheel, *y*, and a train of cog-gearing, *z z′ z²*. This cam has as many faces as may be necessary—such as 1, 2, 3, and 4—and has notches or depressions in its face. (See Fig. 4).

A series of bent spring-levers, $a'$ $a^2$ $a^3$ $a^4$, are pivoted in some convenient place, and one end of each lever is forced down upon the cam by a spring. Two of these levers rest against the spring-catches before described, and when either lever falls into a notch in the cam it throws the catch governed by it within reach of the slide, which consequently depresses the bar carrying that catch. Two other of these levers are connected with joint links, so that they govern the pins that slide through the spring-dogs, and when either of these levers falls into a depression on the revolving cam it throws a pin in reach of a cam on the slide, which in its motion knocks out the dog and permits the set of harness held out of action again to come into action and form a shed.

Now, let it be supposed that the two sets of harness have each been in operation and weaving webbing as an ordinary loom does, and that the time has arrived for commencing a button-hole; then one of the depressions in the cam permits a lever to fall, a latch to be thrown out, and the slide to depress a bar and through the connections, lift up one set of harness and its warp-threads, throwing it out of action; but the other set of harness and the shuttle go on weaving a web of half-width with two selvages, one of which is the ordinary selvage and the other forms one side of the button-hole, until a length equal to a button-hole is woven; then another depression in the cam throws out a pin, so that the set of harness out of action is put in action, and at the same time the same cam permits another lever to fall, another catch to be thrown out, and consequently that set of harness which was in action is now thrown out, while the shuttle goes on weaving the other side of the button-hole. This state of things continues until the full length of button-hole on the second side is woven, when a depression in the cam again comes into play, throws out a pin, and consequently throws the set of harness now dormant into action, when a full width of web is again woven by the action of both sets of harness.

The time at which another button-hole shall be commenced depends upon the arrival of another notch in the cam under its proper lever, and this is regulated by the circumference of the cam, the distance between the notches, and the velocity of the cam as compared with that of the lay-shaft, and any weaver may arrange and modify to suit the article desired to be produced.

The length of a button-hole depends upon the same velocities and circumferences and a disposition of notches, and can be suited to any required purpose; but if the take-up motion went on regularly during the whole time that a button-hole was being woven, it is clear that the last side woven would be irregular, if merchantable at all. The take-up motion must therefore be suspended or stopped while one or both sides of the button-hole are woven, the lay beating up during its stoppage by the yield of the warp-threads, whose tension is regulated by weights or springs; but the most convenient way is to stop the take-up as soon as one side of a button-hole is commenced and to start it again as soon as that side is finished and the other side is begun.

In any way of weaving a button-hole the take-up must be stopped at a determined time and for a certain period, and the way I have devised is by connecting the take-up ratchet with a slow-moving cam, a convenient way in the loom (shown in the drawings) being to connect a ratchet-hand, as $c^2$, by a cord, $d^2$, with a short lever, $e^2$, attached to one of the stirrups, $j^2$, which, as is before described, depends for its time of action on a slow-moving cam. This ratchet-hand actuates the take-up motion in a manner well known to weavers by a connection from the lay as in the drawings, (or other convenient moving part of the loom,) and when it is lifted the take-up rollers or pressure-cylinders cease to revolve until it comes into action again by being dropped.

The time of suspension of action of the take-up under the precise arrangement shown in the drawings will be when a button-hole is commenced; the period of suspension will be that occupied in the weaving of the first half of a button hole. Any desired number of webs may be woven at one time in a loom such as described by well-known arrangements of shuttles, reeds, &c., and more than one slit or button-hole may be woven in the width of the same web by increasing the number of sets of harness and providing proper slow-moving cams to determine their time and period of action. Thus three sets of harness will weave two button-holes in a width, four sets will serve for three button-holes, and in the same ratio for any number.

I wish it to be distinctly understood that I do not limit myself to the special construction of parts or their arrangement, as these may be greatly varied by the substitution of mechanical equivalents, but that I claim the privilege of varying them so long as I attain the same ends by substantially the same means.

What I claim as my invention, and desire to secure by Letters Patent, is—

1. Mounting a loom with two distinct sets of harness, each governing all the warp-threads for the weaving of a web on one side of an intended button-hole or slit, and capable of being thrown out of action each by itself while the other set is in action during the process of weaving button-holes, substantially in the manner and for the purposes hereinbefore specified.

2. Connecting each set of harness capable of being thrown in and out of action and governing all the warp-threads on either side as described with a bar or slide governed by a cam or catch, or the equivalents thereof, to throw one or the other of the said sets of harness out of action when necessary, substantially as described.

3. The combination of the mechanism hereinbefore described for causing one set of harness to cease its action, or any equivalent therefor, with another mechanism substantially such as is hereinbefore described for determining the period during which one set of harness shall remain out of action or lay dormant, or the time or moment at which such harness shall cease to act, or any equivalent therefor, the combination acting substantially as and for the purposes set forth herein.

4. The combination of a slow-moving cam or cams, or its or their equivalents, for determining the time and period, or time or period, during which a set of harness shall be out of action, as hereinbefore set forth, with harness substantially such as is hereinbefore described mounted in sets, each set governing all the warp-threads on one side of a button-hole, so that different sets of harness may be in action or laying dormant at proper times and for proper periods, for purposes substantially as are described.

5. A contrivance substantially such as is herein specified for throwing the take-up motion out of gear, or any equivalent therefor for stopping the take-up, in combination with two sets of harness, each governing warp-threads, substantially as hereinbefore set forth, the combination acting substantially in the manner and for the purposes described.

6. The combination of a slow-moving cam substantially such as is specified, or any equivalent thereof, with a mechanism for stopping or starting a take-up motion substantially such as is herein described, or any equivalent therefor, whereby the time and period, or time or period, of the stoppage or cessation from action of a take-up motion may be determined automatically, for the purposes substantially as set forth.

In testimony whereof I have hereunto subscribed my name, in the city of New Haven, on this 8th of August, A. D. 1837.

W. V. GEE.

In presence of—
CHAS. S. HALL,
WM. B. BRISTOE.